(12) United States Patent
Kondo

(10) Patent No.: US 7,217,743 B2
(45) Date of Patent: May 15, 2007

(54) CURABLE WHITE INK

(75) Inventor: Ai Kondo, Hino (JP)

(73) Assignee: Konica Corporation (JP)

( * ) Notice: Subject to any disclaimer, the term of this patent is extended or adjusted under 35 U.S.C. 154(b) by 5 days.

(21) Appl. No.: 10/623,872

(22) Filed: Jul. 21, 2003

(65) Prior Publication Data

US 2004/0019128 A1    Jan. 29, 2004

(30) Foreign Application Priority Data

Jul. 25, 2002    (JP)    ............................ 2002-216519

(51) Int. Cl.
*C08F 290/06*    (2006.01)

(52) U.S. Cl. ........................... 522/81; 522/71; 522/74; 522/100; 522/103; 522/166; 522/168; 522/169; 522/170; 522/181; 522/178; 522/182; 522/909

(58) Field of Classification Search ................ 522/74, 522/79, 81, 100, 103, 166, 168, 169, 170, 522/181, 178, 182, 909

See application file for complete search history.

(56) References Cited

U.S. PATENT DOCUMENTS 4,680,058 A * 7/1987 Shimizu et al. .......... 106/31.65
6,166,100 A * 12/2000 Hiwara et al. .............. 522/110
6,232,361 B1   5/2001 Laksin et al. ................ 522/84
6,494,943 B1 * 12/2002 Yu et al. ................... 106/31.65
6,783,840 B2 * 8/2004 Watanabe et al. ........... 428/209

FOREIGN PATENT DOCUMENTS

| GB | 2 310 211 A | 8/1997 |
|---|---|---|
| JP | 8143806 A | 6/1996 |
| JP | AN 1996-319138 | 6/1996 |

OTHER PUBLICATIONS

Search Report under Section 17, by the British Patent Office.

* cited by examiner

*Primary Examiner*—James J. Seidleck
*Assistant Examiner*—Sanza L. McClendon
(74) *Attorney, Agent, or Firm*—Squire, Sanders & Dempsey L.L.P.

(57) ABSTRACT

A curable ink for jet-ink recording comprising a white pigment and a polymerizable compound, wherein the polymerizable compound is a compound selected from the group consisting of: (a) oxetane compounds; (b) pyrrole or substituted pyrroles; (c) aniline or substituted anilines; and (d) thiophene or an substituted thiophenes, provided that when the polymerizable compound is the oxetane compound, the curable ink further comprises an epoxy compound or a vinyl ether compound.

8 Claims, No Drawings

CURABLE WHITE INK

BACKGROUND

The present invention relates to a curable white ink composition employed in an ink-jet recording system.

By employing the ink-jet recording system, it is possible to easily and conveniently produce images at low cost. Further, along with recent improvement in image quality, it has received attention as a technique which enables high image quality recording which is sufficiently applicable to various printing fields.

Due to its printing mechanism, generally employed as ink-jet ink compositions are low viscosity ink compositions comprising aqueous solvents or non-aqueous solvents as a main component. Due to that, recording media are preferably ink-adsorptive so that ink droplets which form image dots result in no two-dimensional spread. Specifically, in order to achieve high image quality, special paper is needed.

Contrary to this, proposed as ink compositions capable of being printed onto non-ink absorptive recording media such as film and metal through adhesion are, for example, an ink composition comprised of a component which undergoes polymerization by UV irradiation, described in Japanese Patent Application Open to Public Inspection No. 3-216379, and a UV curable type ink composition comprised of colorants, UV curable agents, and photopolymerization initiators, described in U.S. Pat. No. 5,623,001. Conventionally, however, multifunctional acrylate based compounds employed in UV curable type inks tend to be subjected to curing inhibition in the presence of oxygen during curing. Further, safety concerns exist in that most of them are toxic to skin and result in a rash, and in fact there are few safe compounds. Still further, problems occur in which recording media, when employed as a thin layer substrate for soft packaging or an adhesive label, suffer from shrinkage due to high contraction ratios during curing. As a result, their application has been limited.

Still further, most of the common ink-jet inks are highly transparent inks which are employed for printing onto white recording media. For example, when printing is carried out employing recording media such as a transparent substrate employed in soft packaging or a low lightness substrate, occasionally it is difficult to achieve the desired contrast, as well as bright color formation, and markings with desired visibility.

In the case of poor visibility, a method is known in which desired visibility is achieved employing a high covering white ink. For example, Japanese Patent Publication No. 2-45663 describes a white ink composition which is comprised of inorganic white pigments, organic solvents and binding resins at a viscosity of 1–5 mPa·S at 5–40° C., and Japanese Patent Application Open to Public Inspection No. 2000-336295 proposes a light curable type ink-jet recording ink composition which is comprised of polymerizable compounds, photopolymerization initiators, and aqueous solvents.

However, since the viscosity of these ink compositions is relatively low at room temperature, ejected ink dots spread onto non-ink absorptive media. In addition, since the aforesaid ink compositions comprise solvents, thermal drying is needed to remove residues. As a result, the aforesaid ink compositions are not suitable for printing onto recording media such as thermally shrinkable substrates.

SUMMARY

From the viewpoint of the foregoing, the present invention was achieved. It is an object of the present invention to provide a cation based curable white ink composition for ink-jet printing, which results in excellent visibility for non-ink absorptive transparent recording media, low lightness recording media and metal surfaces, as well as excellent image quality, drying properties, substrate adhesion, and durability, and specifically results in excellent curing properties, minimal shrinkage and safety.

The inventors of the present invention conducted diligent investigations to overcome the aforesaid problems. As a result, it was discovered that the objective of the present invention was achieved by employing any of the embodiments described below.

(1) In a curable white ink composition comprising at least a white pigment and a polymerizable compound, a curable white ink composition wherein said polymerizable compound consists of at least one oxetane compound and at least one compound selected from the group consisting of an epoxy compound and a vinyl ether compound.

(2) The curable white ink composition, described in (1), wherein the amount of said oxetane compound is 65–95 percent by weight with respect to the total ink composition.

(3) In a curable white ink composition comprising at least a white pigment and a polymerizable compound, a curable white ink composition wherein said polymerizable compound is at least one compound selected from the group consisting of pyrrole and substituted pyrrole, aniline and substituted aniline, and thiophene and substituted thiophene.

(4) The curable white ink composition, described in (3), wherein used is at least one compound selected from the group consisting of a compound having a radically polymerizable ethylenic unsaturated bond, a compound such as epoxy and oxetane, having a cyclic ether or vinyl ether group, and a maleimide derivative.

(5) The curable white ink composition, described in any one of (1)–(4), wherein an acid generating agent which generates an acid by irradiation of an actinic light is incorporated.

(6) The curable white ink composition, described in any one of (1)–(4), wherein the amount of white pigment is 1–50 percent by weight.

(7) The curable white ink composition, described in any one of (1)–(4), wherein said white pigment is a white inorganic pigment.

(8) The curable white ink composition, described in any one of (1)–(4), wherein said white pigment is titanium oxide.

(9) The curable white ink composition, described in any one of (1)–(4), wherein said white pigment is a white organic pigment.

(10) The curable white ink composition, described in any one of (1)–(4), wherein the particle diameter of said white pigment is 0.1–1.0 μm.

(11) The curable white ink composition, described in any one of (1)–(4), wherein no substantial amount of solvent is incorporated.

(12) The curable white ink composition, described in any one of (1)–(4), which is applied to an ink-jet recording system.

(13) The curable white ink composition, described in (12), wherein the viscosity of said composition is 10–500 Pa·s at 30° C., and when heated above 40° C., said viscosity is 7–30 Pa·s.

Incidentally, the curable white ink composition, as described herein, refers to one which is employed as a curable white ink without any modifications, as well as one which is employed as a curable white ink with some modifications such as filtration and incorporation of additive.

DESCRIPTION OF THE EMBODIMENTS

The present invention will now be detailed.

A curable white ink for ink-jet printing (hereinafter occasionally referred simply to as ink), employed in the present invention, is comprised of at least white pigment and a polymerizable compound, and in many cases, together with a photopolymerization initiator.

(White Pigments)

White pigments employed in the present invention, when making an ink composition white, are acceptable. Generally, it is possible to use white pigments applicable to this field. Employed as such white pigments may be, for example, white inorganic pigments, white organic pigments, and minute white, hollow polymer particles.

Listed as white inorganic pigments are sulfates of alkaline earth metal such as barium sulfate, carbonates of alkaline earth metal such as calcium carbonate, minute particle silicic acid powders, silicas such as synthetic silicates, calcium silicate, alumina, alumina hydrates, titanium oxide, zinc oxide, talc, and clay. Of these, titanium oxide is specifically known as a white pigment which exhibits desired covering power and tinting properties, as well as resulting in desired diameter of dispersed particles.

Listed as white organic pigments are organic compound salts disclosed in Japanese Patent Application Open to Public Inspection No. 11-129613, and alkylenebismelamine derivatives disclosed in Japanese Patent Application Open to Public Inspection No. 11-140365 and Japanese Patent Application No. 2001-234093.

Listed as specific commercially available products of the aforesaid white pigments are Shigenox OWP, Shigenox OWPL, Shigenox FWP, Shigenox FWG, Shigenox UL, and Shigenox U (all of which are trade manes, produced by Hakkol Chemical Inc.).

Listed as white, minute hollow polymer particles are, for example, minute thermoplastic particles substantially prepared by employing organic polymers, disclosed in U.S. Pat. No. 4,089,800. The aforesaid white pigments may be employed individually or in combination.

Pigment dispersion may be carried out employing a ball mill, a sand mill, an attritor, a roll mill, a pearl mill, a wet type jet mill, and a paint shaker. Further, during pigment dispersion, it is possible to add dispersing agents. Preferably employed as dispersing agents are polymer dispersing agents.

Listed as polymer dispersing agents are Solsperse Series available from Zeneca Corp. Further, employed as dispersing agents may be synergists corresponding to each of the various pigments. The added amount of these dispersing argents and dispersing aids is preferably 1–50 parts by weight with respect to 100 parts by weight of the pigments. Employed as dispersion media are solvents or polymers. Curable ink according to the present invention is cured by irradiation of actinic light, and curing reaction proceeds after the aforesaid ink droplets are subjected to adhesion. Therefore, it is preferable that solvents are not employed. When solvents remain in cured images, solvent resistance is degraded and VOC problems of residual solvents occur. Accordingly, it is preferable that polymerizable compounds are used as dispersing media instead of solvents. Of these, from the viewpoint of adaptation for dispersion, it is preferable to select monomers having the lowest viscosity.

It is preferable that dispersion is carried out to result in an average particle diameter of 0.1–1.0 µm. Pigments, dispersing agents, and dispersion media are selected and dispersion and filtration condition are set so that the maximum particle diameter ranges from 0.3 to 10 µm and preferably from 0.3 to 3 µm. According to the aforesaid particle diameter management, it is possible to minimize clogging of head nozzles, and to maintain desired storage stability of ink, ink covering properties and curing rate.

White pigments are incorporated commonly in an amount of 1–50 percent by weight with respect to the total ink composition, and preferably in an amount of 2–30 percent by weight. When the content is less than the lower limit, the desired covering properties are not achieved. On the other hand, when the content is beyond the upper limit, the ejection properties due to ink-jetting are degraded to cause clogging.

(Polymerizable Compounds)

Listed as first compounds employed in the present invention are oxetane compounds, as well as epoxy compounds and vinyl ether compounds.

The proportion of the aforesaid oxetane compounds is preferably 65–95 percent by weight with respect to the total ink composition. Japanese Patent Application Open to Public Inspection No. 2001-220526 discloses an actinic radiation curable type ink composition, comprising oxetane compounds, which is used for ink-jet printing. By maintaining the proportion of oxetane compounds in the range of 65–95 percent by weight with respect to the total ink composition, the inventors of the present invention discovered the following. The ink curing rate described in the publication of the aforesaid invention was raised. In addition, in ink-jet recording in which the printed ink layer was thicker than conventional printing, it was possible to markedly minimize curling as well as wrinkling of recording materials due to ink shrinkage which occurs during ink curing. Further, by maintaining the proportion of oxetane compounds in the range of 65–95 percent by weight with respect to the total ink composition, it was discovered that it was possible to markedly stabilize ink ejection and to form highly detailed images at desired reproduction.

Heretofore, in the soft packaging printing and label printing fields, from the viewpoint of wrinkling of recording materials as well as ejection stability, actinic light curable type ink-jet recording has not been successfully put into practical use. However, by practicing the present invention, it is possible to apply the aforesaid ink-jet recording to such fields.

Further, Japanese Patent Application Open to Public Inspection No. 9-31186 discloses a rapidly curable printing ink comprised of oxetane compounds. However, it is still not possible to apply the proposed embodiment to an ink-jet recording system.

Oxetane compounds, according to the present invention, refer to compounds having an oxetane ring. It is possible to use oxetane compounds, known in the art, such as those described in Japanese Patent Application Open to Public Inspection Nos. 2001-220526 and 2001-310937.

In the present invention, when oxetane compounds having at least 5 oxetane rings are used, it is difficult to handle the resulting ink due to an increase in viscosity, and is impossible to result in sufficient adhesion properties of cured materials due to an increase in the glass transition point of the resulting ink. The number of oxetane rings of oxetane compounds employed in the present invention is preferably 1–4.

Specific examples of compounds having an oxetane ring according to the present invention will now be described. However, the presented invention is not limited thereto.

Listed as one example of compounds having one oxetane ring is the compound represented by General Formula (1) described below.

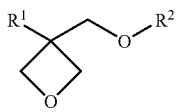

General Formula (1)

In General Formula (1), $R^1$ represents a hydrogen atom, an alkyl group having 1–6 carbon atoms such as a methyl group, an ethyl group, a propyl group, and a butyl group, a fluoroalkyl group having 1–6 carbon atoms, an allyl group, an aryl group, a furyl group or an ethynyl group, and $R^2$ represents an alkyl group having 1–6 carbon atoms such as a methyl group, an ethyl group, a propyl group, and a butyl group, an alkenyl group having 2–6 carbon atoms such as a 1-propenyl group, a 2-propenyl group, a 2-methyl-1-propenyl group, a 2-methyl-2-propenyl group, a 1-burtnyl group, a 2-butenyl group, and a 3-butenyl group, a group having an aromatic ring such as a phenyl group, a benzyl group, a fluorobenzyl group, a methoxybenzyl group, and a phenoxyethyl group, an alkoxycarbonyl group having 2–6 carbon atoms such as an ethoxycarbonyl group, a propoxycarbonyl group, and a butoxycarbonyl group, or an N-alkylcarbamoyl group having 2–6 carbon atoms such as an ethylcarbamoyl group, a porpylcarbamoyl group, a butylcarbamoyl group, and a pentylcarbamoyl group. It is preferable that the oxetane compounds employed in the present invention have one oxetane ring because the resulting composition results in the desired adhesion as well as excellent workability due to a lower viscosity.

Listed as one example of the compound having two oxetane rings is the compound represented by General Formula (1) described below.

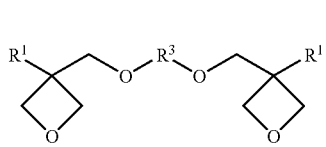

General Formula (2)

In General Formula (2), $R^1$ represents the same group as defined for aforesaid General Formula (1), and $R^2$ represents, for example, a linear or branched alkylene group such as an ethylene group, a propylene group, and a butylene group, a linear or branched poly(alkyleneoxy) group such as a poly(ethyleneoxy) group, a poly(propylene) group, a linear or branched unsaturated hydrocarbon group such as a propenylene group, a methylpropenylene group and a butenylene group, a carbonyl group, an alkylene group containing a carbonyl group, an alkylene group containing a carboxyl group, and an alkylene group containing a carbamoyl group.

Further, listed as $R^3$ may be a multivalent group selected from the group consisting of the groups represented by General Formulas (3), (4), and (5) described below.

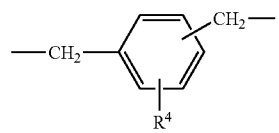

General Formula (3)

In General Formula (3), $R^4$ represents a hydrogen atom, an alkyl group having 1–4 carbon atoms such as a methyl group, an ethyl group, a propyl group, and a butyl group, an alkoxy group having 1–4 carbon atoms such as a methoxy group, an ethoxy group, a propoxy group, and a butoxy group, a halogen atom such as a chlorine atom, and a bromine atom, a nitro group, a cyano group, a mercapto group, a lower alkykcarboxyl group, a carboxyl group, or a carbamoyl group.

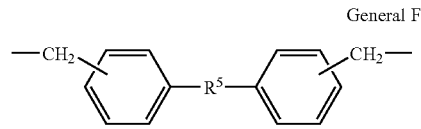

General Formula (4)

In General Formula (4), $R^5$ represents an oxygen atom, a sulfur atom, a methylene group, NH, SO, $SO_2$, $C(CF_3)_2$ or $C(CH_3)_2$.

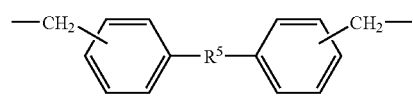

General Formula (5)

In General Formula (5), $R^6$ represents an alkyl group having 1–4 carbon atoms such as a methyl group, an ethyl group, a propyl group, a butyl group, or an aryl group; n represents an integer of 0–2,000; and $R^7$ represents an alkyl group having 1–4 carbon atoms such as a methyl group, an ethyl group, a propyl group, or a butyl group, or an aryl group. Further, listed as $R^7$ may be a group selected from the groups represented by General Formula (6) described below.

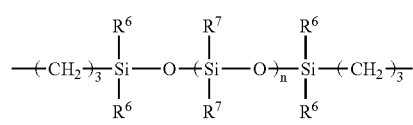

General Formula (6)

In General Formula (6), $R^9$ represents an alkyl group having 1–4 carbon atoms such as a methyl group, an ethyl group, a propyl group, or a butyl group, or an aryl group, while m represents an integer of 0–100.

Listed as specific examples of compounds having two oxetane rings are the compounds described below.

Exemplified Compound 1

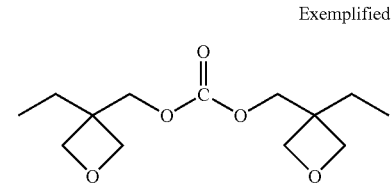

Exemplified Compound 2

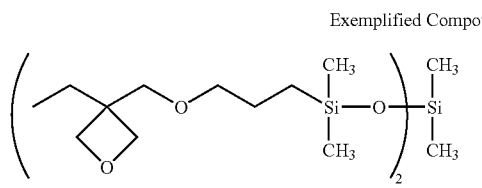

Exemplified Compound 1 is a compound in which, in aforesaid General Formula (2), $R^1$ represents an ethyl group and $R^3$ represents a carbonyl group. Further, Exemplified Compound 2 is a compound in which, in aforesaid General Formula (2), $R^1$ represents an ethyl group, $R^3$ represents $R^6$ in aforesaid General Formula (5), and $R^7$ represents a methyl group, while n represents 1.

In compounds having two oxetane rings, listed as preferred examples, other than the aforesaid compounds, are the compounds represented by General Formula (7) described below. In General Formula (7), $R^1$ is defined above for $R^1$ in aforesaid General formula (1).

General Formula (7)

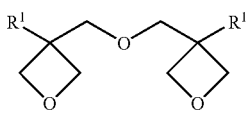

Further, listed as one example of compounds having three or four oxetane rings is the compound represented by General Formula (8) described below.

General Formula (8)

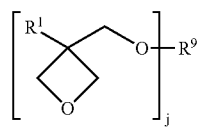

In General formula (8), $R^1$ is as defined for $R^1$ in aforesaid General Formula (1); listed as $R^9$ are, for example a branched alkylene group having 1–12 carbon atoms such as groups shown as A-C described below, a branched poly (alkyleneoxy) group shown as D described below or a branched polysiloxy group shown as E described below; and j represent 3 or 4.

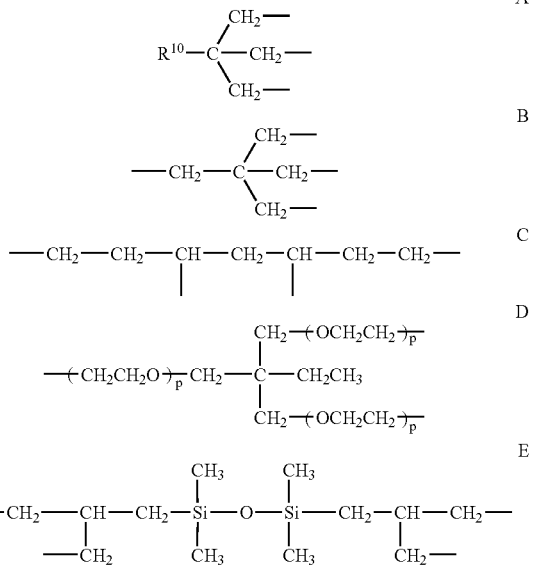

In aforesaid A, $R^{10}$ represents a lower alkyl group such as a methyl group, an ethyl group or a propyl group. Further, in aforesaid D, p represents an integer of 1–10.

Listed as one example of the compound having three or four oxetane rings is Exemplified Compound 3.

Exemplified Compound 3

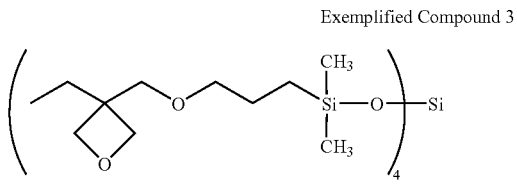

Further listed as examples of compounds having one to four oxetane rings, other than those already described above, are the compounds represented by General Formula (9) described below.

General Formula (9)

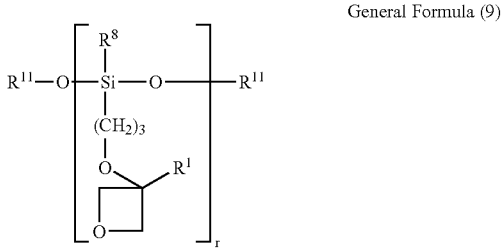

In General Formula (9), $R^8$ is as defined for $R^8$ in aforesaid General Formula (6), $R^{11}$ represents an alkyl group having 1–4 carbon atoms such as a methyl group, an ethyl group, a propyl group or a butyl group, and a trialkylsilyl group, while r represents an integer of 1–4.

Specific examples of preferred oxetane compounds employed in the present invention include the compounds shown below.

Exemplified Compound 4

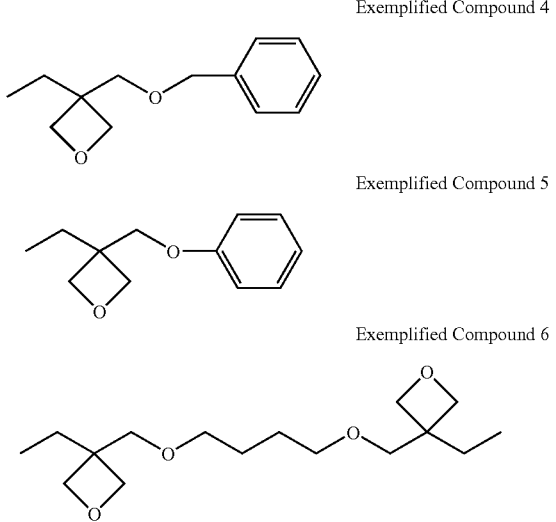

Exemplified Compound 5

Exemplified Compound 6

The production method of each of the aforesaid compounds having an oxetane ring(s) is not particularly limited, and conventional production methods may be employed. For example, there is known an oxetane ring synthesis method starting from diol, which is disclosed in D. B. Pattison, J. Am. Chem. Soc., 3455, 79 (1957). Further, other than this, listed are compounds having 1–4 oxetane rings which have a high molecular weight of 1,000–5,000. Listed as specific examples of such compounds are those described below.

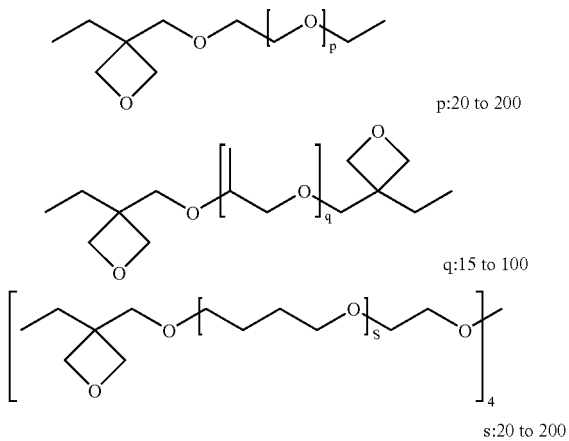

p:20 to 200 q:15 to 100 s:20 to 200

Epoxy compounds according to the present invention will now be described.

Employed as aforesaid epoxy compounds may be any of the epoxy compounds known in the art, which are described, for example, in Japanese Patent Application Open to Public Inspection Nos. 2001-55507, 2001-31892, 2001-40068, and 2001-310938.

Preferred aromatic epoxides include diglycidyl ether or polyglycidyl ether, which is produced by allowing polyhydric phenol, having at least one aromatic nucleus or alkyleneoxide addition products thereof, to react with epichlorohydrin. For example, listed are diglycidyl ether or polyglycidyl ether of bisphenol A or an alkylene oxide addition product thereof, diglycidyl ether or polyglycidyl ether of hydrogenated bisphenol A or an alkylene oxide addition product thereof, and novolak type epoxy resins. Herein, listed as alkylene oxides are ethylene oxide and propylene oxide.

It is possible to prepare alicyclic epoxies by epoxidizing compounds having at least one cycloalkane ring such as a cyclohexane or cyclopentane ring, employing suitable oxidizing agents such as hydrogen peroxide or peroxides. Preferred are compounds containing cyclohexane oxide or cyclopentane oxide.

Preferred aliphatic epoxides include diglycidyl ether or polyglycidyl ether of aliphatic polyhydric alcohol or alkylene oxide addition products thereof. Listed as representative examples are diglycidyl ether of alkylene glycol such as glycidyl ether of ethylene glycol, glycidyl ether of propylene glycol, or diglycidyl ether of 1,6-hexanediol; diglycidyl ether of polyalkylene glycol such as polyglycidyl ether of polyhydric alcohol such as di- or triglycidyl ether of glycerin or alkylene oxide addition products thereof, diglycidyl ether of polyethylene glycol or alkylene oxide addition products thereof, and diglycidyl ether of polypropylene glycol or alkylene oxide addition products thereof. Listed herein as alkylene oxides are ethylene oxide and propylene oxide.

Of these epoxies, from the perspective of rapid curing, preferred are aromatic epoxides and alicyclic epoxies. Of these, alicyclic epoxies are particularly preferred. In the present invention, the aforesaid epoxies may be individually employed together with oxetane compounds, but may also be employed in combinations of at least two types.

Vinyl ether compounds according to the present invention will now be described.

Employed as vinyl ether compounds according to the present invention may be any of the vinyl ether compounds known in the art. Examples include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol vinyl ether, trimethylol trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, or octadecyl vinyl ether.

Of these vinyl ether compounds, from the viewpoint of curing properties, contacting properties, and surface hardness, divinyl ether compounds as well as trivinyl ether compounds are preferred, and of these, divinyl compounds are particularly preferred. In the present invention, the aforesaid vinyl ether compounds may be employed individually together with oxetane compounds or may be employed in combinations of at least two types.

Listed as the second form of polymerizable compounds employed in the present invention are pyrrole and substituted pyrroles, aniline and substituted anilines, and thiophene and substituted thiophenes.

Substituted pyrroles include N-alkylpyrroles such as N-pyrrole, and N-ethylpyrrole, N-arylpyrroles such as N-phenylpyrrole, 2-nitrophenylpyrrole, 3-methylpyrrole, 3-ethylpyrrole, 3-chloropyrrole, 3,4-dimethylpyrrole, and 3,4-dichloropyrrole. Substituted anilines include N-methylaniline, N-ethylaniline, N-dimethylaniline, N-diethylaniline, chloroaniline, dichloroaniline, chloro-N-methylaniline, chloro-N-dimethylaniline, dichloro-N-acetylaniline, and phenylenediamine. Substituted thiophenes include 3-methylthiophene, 3-ethylthiophene, 3-chlorothiophene, 3,4-dimethylthiophene, 3,4-dichlorothiophene, and 2,2'-bithiophene.

Specific examples of radically polymerizable compounds in the present intention will now be listed.

Examples of Acrylates

Examples of uni-functional alkyl acrylates: methyl acrylate, ethyl acrylate, propyl acrylate, isopropyl acrylate, butyl acrylate, isoamyl acrylate, hexyl acrylate, 2-ethylhexyl acrylate, octyl acrylate, decyl acrylate, lauryl acrylate, stearyl acrylate, isobornyl acrylate, cyclohexyl acrylate, dicyclopentenyl acrylate, and dicyclopentenyloxyethyl acrylate.

Examples of uni-functional acrylates containing hydroxyl: 2-hydroxyethyl acrylate, 2-hydroxypropyl acrylate, 2-hydroxy-3-chloropropyl acrylate, 2-hydroxy-3-phenoxypropyl acrylate, 2-hydeoxy-3-allyloxypropyl acrylate, and 2-acroyloxyethyl-2-hydroxypropyl phthalate.

Examples of uni-functional acrylates containing halogen: 2,2,2-trifluoroethyl acrylate, 2,2,3,3-tetrafluoropropyl acrylate, 1H-hexafluoroisopropyl acrylate, 1H,1H,5H-octafluoropentyl acrylate, 1H,1H,2H,2H-heptadecafluorodecyl acrylate, 2,6-dibromo-4-butylphenyl acrylate, 2,4,6-tribromophenoxyethyl acrylate, and 2,4,6-tribromophenol 3EO added acrylate.

Examples of uni-functional acrylates containing an ether group: 2-methoxyethyl acrylate, 1,3-butylene glycol methyl ether acrylate, butoxyethyl acrylate, methoxytriethylene glycol acrylate, methoxypolyethylene glycol #400 acrylate, methoxydipropylene glycol acrylate, methoxypolypropylene glycol acrylate, ethoxydiethylene glycol acrylate, 2-ethylhexylcarbitol acrylate, tetrahydrofurfuryl acrylate, phenoxyethylene acrylate, phenoxydiethylene glycol acrylate, phenoxypolyethylene glycol acrylate, cresylpolyethylene glycol acrylate, p-nonylphenoxyethyl acrylate, p-nonylphnoxypolyethylene glycol acrylate, and glycidyl acrylate.

Uni-functional acrylates containing a carboxyl group: β-carboxyethyl acrylate, monoacryloyloxyethyl succinate, ω-carboxypolycaprolactone monoacrylates, 2-acryloyloxyethylhydrogen phthalate, 2-acryloyloxypropylhydrogen phthalate, 2-acryloyloxypropylhydrogen phthalate, 2-acryloyloxypropylhexahydrohydrogen phthalate, and 2-acryloyloxypropyltetrahydrohydrogen phthalate.

Examples of other uni-functional acrylates: N,N-dimethylaminoethyl acrylate, N,N-dimethylaminopropyl acrylate, morpholinoethyl acrylate, trimethylcyloxyethyl acrylate, diphenyl-2-acryloyloxyethyl phosphate, 2-acryloyloxyethylacid phosphate, and caprolactone-modified-2-acryloyloxyethylacid phosphate.

Examples of bifunctional acrylates: 1,4-butanediol diacrylate, 1,6-hexanediol diacrylate, diethylene glycol diacrylate, triethylene glycol diacrylate, tetraethylene glycol diacrylate, polyethylene glycol #200 diacrylate, polyethylene glycol #300 diacrylate, polyethylene glycol #400 diacrylate, polyethylene glycol #600 diacrylate, dipropylene glycol diacrylate, tripropylene glycol diacrylate, tetrapropylene glycol diacrylate, polypropylene glycol #400 diacrylate, polypropylene glycol #700 diacrylate, neopentylglycol diacrylate, neopentylglycol PO (propylene oxide)-modified diacrylate, hydroxypivalic acid neopentylglycol ester diacrylate, hydroxypivalic acid neopentylglycol ester caprolactone addition product diacrylate, 1,6-hexanediolbis(2-hydroxy-3-acryloyloxypropyl) ether, 1,9-nonandiol diacrylate, pentaerythritol diacrylate, pentaerythritol diacrylate monostearate, pentaerythritol diacrylate monobenzoate, bisphenol A diacrylate, EO (ethylene oxide)-modified bisphenol A diacrylate, PO-modified bisphenol A diacrylate, hydrogen added bisphenol A diacrylate, EO-modified hydrogenated bisphenol A diacrylate, PO-modified hydrogenated bisphenol A diacrylate, bisphenol F diacrylate, EO-modified bisphenol F diacrylate, PO-modified bisphenol F diacrylate, EO-modified tetrabromobisphenol A diacrylate, tricyclodecane dimethylol diacrylate, and isocyanuric acid EO-modified diacrylate.

Examples of tri-functional acrylates: glycerin PO-modified triacrylate, trimethylolpropane triacrylate, trimethylolpropane EO-modified triacrylate, trimethylolpropane PO-modified triacrylate, isocianuric acid EO-modified triacrylate, isocianuric acid EO-modified ε-caprolactone-modified triacrylate, 1,3,5-triacryloylhexahydro-s-triazine, pentaerythritol acrylate, and dipentaerythritol triacrylate tripropionate.

Examples of tetra- or higher multi-functional acrylates: pentaerythritol tetraacrylate, dipentaerythritol pentaacrylate monopropinate, dipentaerythritol hexaacrylate, tetramethylolethane tetraacrylate, oligoester tetraacrylate, and tris(acryloyloxy)phosphate.

Examples of Methacrylates

Examples of uni-functional alkyl methacrylates: methyl methacrylate, ethyl methacrylate, propyl methacrylate, isopropyl methacrylate, butyl methacrylate, isoamyl methacrylate, hexyl methacrylate, 2-ethylhexyl methacrylate, octyl methacrylate, decyl methacrylate, lauryl methacrylate, stearyl methacrylate, isobornyl methacrylate, cyclohexyl methacrylate, dicyclopentenyl methacrylate, dicyclopentenyloxyethyl methacrylate, and benzyl methacrylate.

Examples of uni-functional methacrylates containing hydroxy: 2-hydroxyethyl methacrylate, 2-hydroxypropyl methacrylate, 2-hydroxy-3-chloropropyl methacrylate, 2-hydroxy-3-phenoxypropyl methacrylate, 2-hydroxy-3-allyloxypropyl methacrylate, and 2-methacryloyloxyethyl-2-hydroxypropyl phthalate.

Examples of uni-functional methacrylates containing a halogen(s): 2,2,2-trifluoroethyl methacrylate, 2,2,3,3-tetrafluoropropyl methacrylate, 1H-hexafluoroisopropyl methacrylate, 1H,1H,5H-octafluoropentyl methacrylate, 1H,1H,2H,2H-heptadecfluorodecyl methacrylate, 2,6-dibromo-4-butylphenyl methacrylate, 2,4,6-tribromophenoxyethyl methacrylate, and 2,4,6-tribromophenol 3EO addition methacrylate.

Examples of uni-functional methacrylates containing a ether group: 2-methoxyethyl methacrylate, 1,3-butylene glycol methyl ether methacrylate, butoxyethyl methacrylate, methoxytriethylene glycol methacrylate, methoxypolyethylene glycol #400 methacrylate, methoxydipropylene glycol methacrylate, methoxytripropylene glycol methacrylate, methoxypolypropylene glycol methacrylate, ethoxydiethylene glycol methacrylate, 2-ethylhexylcarbitol methacrylate, tetrahydrofurfuryl methacrylate, phenoxyethyl methacrylate, phenoxydiethylene glycol methacrylate, phenoxypolyethylene glycol methacrylate, cresylpolyethylene glycol methacrylate, p-nonylphenoxyethyl methacrylate, p-nonylphenoxypolyethylene glycol methacrylate, and glycidyl methacrylate.

Examples of uni-functional methacrylates containing a carboxyl group: β-caroxyethyl methacrylate, monomethacryloyloxyethyl succinate, ω-carboxypolycaprolactone monomethacrylate, 2-methacyloyloxyethyl hydrogen phthalate, 2-methacyloyloxypropyl hydrogen phthalate, 2-methacryloyloxypropyl hexahydrogen phthalate, and 2-methacryloyloxypropyl tetrahydrogen phthalate.

Example of other uni-functional methacrylates: N,N-dimethylaminoethyl methacrylate, N,N-dimethylaminopropyl methacrylate, morpholinoethyl methacrylate, trimethylsiloxyethyl methacrylate, diphenyl-2-methacryloyloxyethyl phosphate, 2-methacryloyloxyethyl acid phosphate, and modified caprolactone-2-methacryloyloxyethyl acid phosphate.

Examples of bifunctional methacrylates: 1,4-butanediol dimethacrylate, 1,6-hexanediol dimethacrylate, diethylene glycol dimethacrylate, triethylene glycol dimethacrylate, tetraethylene glycol dimethacrylate, polyethylene glycol #200 dimethacrylate, polyethylene glycol #300 dimethacrylate, polyethylene glycol #400 dimethacrylate, polyethylene glycol #600 dimethacrylate, dipropylene glycol dimethacrylate, tripropylene glycol dimethacrylate, tetrapropylene glycol dimethacrylate, polypropylene glycol #400 dimethacrylate, polypropylene glycol #700 dimethacrylate, neopentylglycol dimethacrylate, neopentylglycol PO (propylene oxide)-modified dimethacrylate, hydroxypivalic acid neopentylglycol ester dimethacrylate, hydroxypivalic acid neopentylglycol ester caprolactone addition product dimethacrylate, 1,6-hexanediolbis(2-hydroxy-3-methacryloyloxypropyl) ether, 1,9-nonandiol dimethacrylate, pentaerythritol dimethacrylate, pentaerythritol dimethacrylate monostearate, pentaerythritol dimethacrylate monobenzoate, bisphenol A dimethacrylate, EO-modified bisphenol A dimethacrylate, PO-modified bisphenol A dimethacrylate, hydrogenated bisphenol A dimethacrylate, EO-modified hydrogenated bisphenol A dimethacrylate, PO-modified hydrogenated bisphenol A dimethacrylate, bisphenol F dimethacrylate, EO-modified bisphenol F dimethacrylate, PO-modified bisphenol F dimethacrylate, EO-modified tetrabromobisphenol A dimethacrylate, tricyclodecane dimethylol dimethacrylate, isocyanuric acid EO-modified dimethacrylate.

Examples of tri-functional methacrylates: glycerin PO-modified trimethacrylate, trimethylolpropane trimethacrylate, trimethylolpropane EO-modified trimethacrylate, trimethylolpropane PO-modified trimethacrylate, isocianuric acid EO-modified trimethacrylate, isocianuric acid EO-modified ε-caprolactone-modified trimethacrylate, 1,3,5-trimethacryloylhexahydro-s-triazine, pentaerythritol methacrylate, and dipentaerythritol trimethacrylate tripropionate.

Examples of tetra- or higher multifunctional methacrylates: pentaerythritol tetramethacrylate, dipentaerythritol pentamethacrylate monopropionate, dipentaerythritol hexamethacrylate, tetramethylolethane tetramehacrylate, oligoester tetramethacrylate, and tris(methacryloyloxy)phosphate.

Examples of allylates: allyl glycidyl ether, diallyl phthalate, triallyl trimellitate, and isocyanuric acid triallylate.

Examples of acid amides: acrylamide, N-methylolacrylamide, diacetone acrylamide, N,N-dimethylacrylamide, N,N-diethylacrylamide, N-isopropylacrylamide, acroylmorpholine, methacrylamide, N-methylolmethacrylamide, diacetonmethacrylamide, N,N-dimethylmethacrylamide, N,N-diethylmethacrylamide, N-isopropylmethacrylamide, and methacryloylmorpholine.

Examples of styrenes: styrene, p-hydroxystyrene, p-chlorostyrene, p-bromostyrene, p-methylstyrene, p-methoxystyrene, p-t-butoxystyrene, p-t-butoxycarbonylstyrene, p-t-butoxycarbonyloxystyrene, and 2,4-diphenyl-4-methyl-1-pentane.

Examples of other vinyl compounds: vinyl acetate, vinyl monochloroacetate, vinyl benzoate, vinyl pivaliate, vinyl butyrate, vinyl laurate, divinyl adipate, vinyl methacrylate, vinyl crotonate, vinyl 2-ethylhexanate, N-vinylcarbazole, and N-vinylpyrrolidone.

The aforesaid radically polymerizable compounds are readily commercially available from manufactures shown below. For example, listed are "Light Acrylate", "Light Ester", "Epoxy Ester", "Urethane Acrylate", and "High Functional Oligomer" Series, manufactured by Kyoueisha Yushi Kagaku Kogyo Co.; "NK Ester" and "NK Oligo" Series, manufactured by Shin-Nakamura Kagaku Co.; "Fancryl" Series, manufactured by Hitachi Kasei Kogyo Co.; "Aronics M" Series manufactured by Toagosei Kagaku Co.; "Functional Monomer" Series, manufactured by Daihachi Kagaku Kogyo Co.; "Special Acryl Monomer" Series, manufactured by Osaka Yuki Kagaku Kogyo Co.; "Acryl Ester" and "Dia Beam Oligomer" Series, manufactured Mitsubishi Rayon Co.; "Kayarad" and "Kayamer" Series, manufactured by Nippon Kayaku Co.; "Acrylic Acid/Methacrylic Acid Ester Monomer" Series, manufactured by Nippon Shokubai Co.; "Nichigo-UV Shiko Urethane Acrylate Oligomer" Series, manufactured by Nippon Gosei Kagaku Kogyo Co.; "Carboxylic Acid Vinyl Ester Monomer" Series, manufactured by Shin-Etsu Sakusan Vinyl Co.; and "Functional Monomer" Series manufactured by Kojin Co. Radically polymerizable compounds of the present invention may be employed individually or in combinations of at least two types in order to enhance desired characteristics.

Employed as maleimide derivatives may be ant of the compounds known in the art. For example, employed may be compounds described in Japanese Patent Application Open to Public Inspection Nos. 61-2500064, 62-64813, 62-79243, 6-298817, 11-124403, 11-292874, 11-302278, and 2000-264922; "Polymer Materials Science and Engineering", Volume 72, pages 470–472 (1955); "Polymer Preprints", Volume 37, pages 348-349 (1996); "Dai 4 Kai Fusion UV Gijutsu Seminar (The Fourth Fusion UV Technology Seminar)", pages 43–77 (1996); "Polymer Letters", Volume 6, pages 883–888 (1998); and "Dai 9 Kai Fusion UV Gijutsu Seminar (The Ninth Fusion UV Technology Seminar)", pages 5–20 (2001).

(Photolytically Acid Generating Agents)

Listed as photolytically acid generating agents may be any of the photolytically acid generating agents known in the art.

Listed as photolytically acid generating agents are compounds utilized in chemical amplification type photoresist and cation photopolymerization (refer to "Imaging yo Yuki Zairyo (Imaging Organic Materials)", pages 187–192, published by Bunshin Shuppan (1993). Example of compounds suitable for the present invention are listed below.

First, listed may be salts of $B(C_6F_5)_4^-$, $PH_6^-$, $AsF_6^-$ $SbF_6^-$, and $CF_3SO_3^-$ of aromatic onium compounds such as diazonium, ammonium, iodonium, sulfonium, and phosphonium.

Specific examples of onium compounds usable in the present invention are shown below.

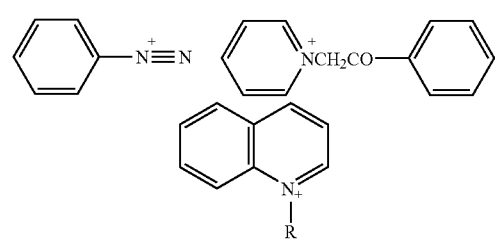

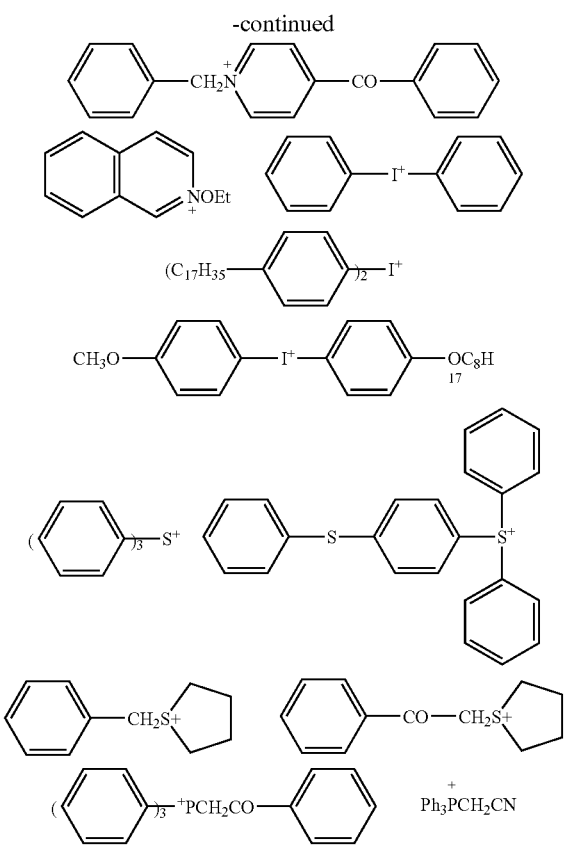
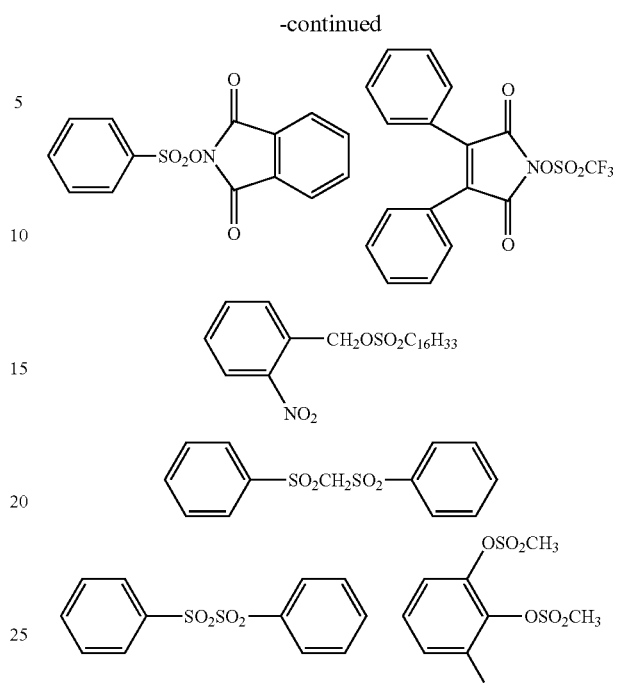
Secondly, listed may be compounds which generate sulfonic acid. Specific examples of the aforesaid compounds are shown below.
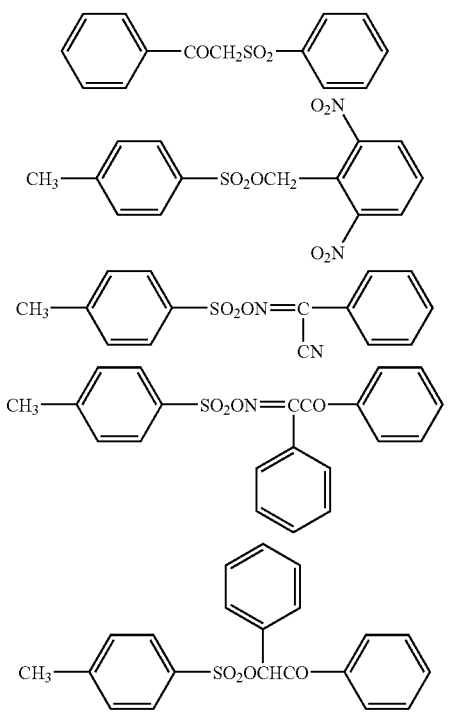
Thirdly, employed may be halides which generate hydrogen halide through photolysis. Specific examples of the aforesaid compounds are shown below.
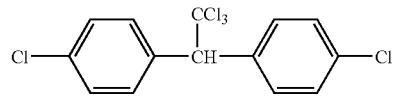
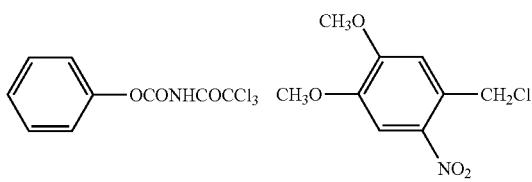
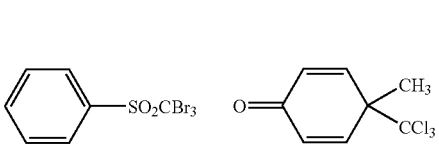
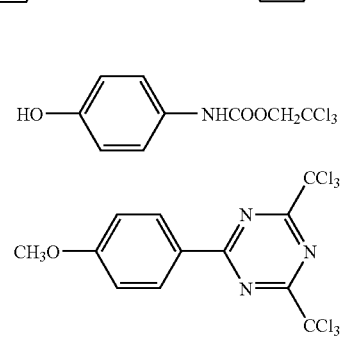

Fourthly, listed may be iron allene complexes.

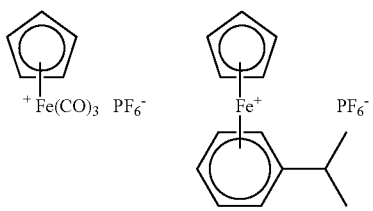

It is preferable that ink according to the present invention comprises acid breeding agents which further generate acid utilizing acids generated by irradiation of actinic light. Incidentally, the aforesaid acid breeding agents have been known in the art through patent publications such as Japanese Patent Application Open to Public Inspection Nos. 8-248561 and 9-34106.

(Other Components)

If desired, it is possible to add other appropriate components to the inventive ink.

When UV radiation, visible light, and infrared radiation are employed as a radiation source, it is common that radical polymerization initiators, initiation aids, and sensitizing dyes, which correspond to specific wavelengths, are added. The necessary added amount of these components is customarily 1–10 parts by weight with respect to the total ink. Employed as initiators may be various compounds known in the art, but are usually those selected which dissolve the aforesaid polymerizable compounds. Listed as specific initiators are xanthone or thioxanthone based, benzophenone based, quinone based, and phosphine oxide based compounds.

Further, in order to enhance storage stability, it is possible to add polymerization inhibitors in an amount of 200-20,000 ppm. Since the ink of the present invention is heated in the range of 40–80° C. to lower the viscosity and then ejected, it is preferable that the aforesaid polymerization inhibitors are incorporated to minimize nozzle clogging due to thermal polymerization.

Other than those, if desired, it is possible to add leveling agents, matting agents, as well as polyester based resins, polyurethane based resins, vinyl based resins, acryl based resins, rubber based resins, and wax to control physical properties of the resulting layer. In order to enhance close contact onto recording media such as olefin and PET, it is preferable that tackifiers which do not hinder polymerization are incorporated.

Specifically listed are high molecular weight adhesive polymers (such as copolymers comprised of the ester of (meth)acrylic acid with alcohol having an alkyl group having 1–20 carbon atoms, the ester of (meth)acrylic acid with alicyclic alcohol having 3–14 carbon atoms, and the ester of (meth)acrylic acid with aromatic alcohol having 6–14 carbon atoms, or adhesion providing low molecular weight resins having a polymerizable unsaturated bond.

In order to enhance close contact onto recording media, organic solvents, which do not adversely affect drying properties, may be added in a very small amount. In such cases, the addition is effective in the range which does not result in problems with solvent resistance and VOC. The amount is customarily 0.1–5 percent by weight, and is preferably 0.1–3 percent by weight.

Further, as a means to minimize the decrease in speed due to light shielding effect of ink colorants, ink may be modified into a radical-cation hybrid type curing ink by combining cation polymerizable monomers having a long life as an initiator with the initiators.

(Viscosity of Ink Compositions)

It is preferable to determine an ink composition ratio so that the viscosity of the resulting ink composition is 10–500 mPa·s at 30° C., and is 7–30 mPa·s when heated at 40° C. or higher (the upper limit being approximately 50° C.).

The reason for the above is as follows. By increasing the viscosity at room temperature, penetration of ink into absorptive recording media is minimized and the amount of non-cured monomers decreases. Further, it is possible to minimize unpleasant odor and also to minimize bleeding of ejected ink dots, resulting in improvement of image quality. Still further, similar dots are formed on substrates even though they result in different surface tension, whereby similar image quality is achieved. When the aforesaid viscosity is less than 10 mPa·s, the bleeding is not effectively minimized, while when it exceeds 500 mPa·s, problems result in reliable ink supply.

Further, in order to achieve stable ejection properties, the viscosity of the aforesaid ink composition is preferably 7–30 mPa·s at 40° C. or higher.

EXAMPLES

The present invention will now be detailed with reference to examples.

(Preparation of White Pigment Dispersion)

The components described below were blended employing a pressure kneader and subsequently the resulting blend was kneaded and dispersed employing a roll mill, whereby White Pigment Dispersions 1 and 2 were prepared.

| White Pigment Dispersion 1 | |
|---|---|
| Titanium oxide (having an average particle diameter of 0.15 μm and a refractive index of 2.52) | 25.00 weight parts |
| Neutral polymer dispersing agent | 1.25 weight parts |
| Oxetane compound (Aron Oxetane OXT-221), manufactured by Toagosei Kagaku Co.) | 73.75 weight parts |
| White Pigment Dispersion 2 | |
| White organic pigment (Shigenox OWP, having a particle diameter of 0.3 μm, manufactured by Hakkol Chemical Co.) | 25.00 weight parts |
| Neutral polymer dispersing agent | 3.75 weight parts |
| Oxetane compound (Aron Oxetane OXT-221), manufactured by Toagosei Kagaku Co.) | 71.25 weight parts |

By employing the aforesaid dispersions, ink formulated as described below was prepared.
(Preparation of Ink Compositions)

| Ink Composition 1 | |
|---|---|
| White Pigment Dispersion 1 | 20 weight parts |
| Oxetane compound (Aron Oxetane OXT-221, manufactured by Toagosei Kagaku Co.) | 21 weight parts |
| Oxetane compound (Aron Oxetane OXT-211, manufactured by Toagosei Kagaku Co.) | 27 weight parts |
| Epoxy compound (Celoxide 2021P, manufactured by Dicel Kagaku | 27 weight parts |

-continued

| | |
|---|---|
| Kogyo Co.) | |
| Photolytically acid generating agent | 5 weight parts |
| (PF$_6^-$ salt of sulphonium, | |
| SP-152, manufacture by Asahi | |
| Denka Kogyo Co.) | |
| Ink Composition 2 | |
| | |
| White Pigment Dispersion 2 | 20 weight parts |
| Oxetane compound (Aron Oxetane | 21 weight parts |
| OXT-221, manufactured by | |
| Toagosei Kagaku Co.) | |
| Oxetane compound (Aron Oxetane | 27 weight parts |
| OXT-211, manufactured by | |
| Toagosei Kagaku Co.) | |
| Epoxy compound (Celoxide 2021P, | 27 weight parts |
| manufactured by Dicel Kagaku | |
| Kogyo Co.) | |
| Photolytically acid generating agent | 4.5 weight parts |
| (SP-152, manufactured by | |
| Asahi Denka Kogyo Co.) | |
| Initiation aid (diethylthioxanthone) | 0.5 weight part |
| Ink Composition 3 (Comparative Example) | |
| | |
| White Pigment Dispersion 1 | 20 weight parts |
| Epoxy compound (Celoxide 2021P, | 75 weight parts |
| manufactured by Dicel Kagaku | |
| Kogyo Co.) | |
| Photolytically acid generating agent | 5 weight parts |
| (SP-152, manufactured by | |
| Asahi Denka Kogyo Co.) | |
| Ink Composition 4 | |
| | |
| White Pigment Dispersion 2 | 20 weight parts |
| Oxidatively polymerizable | 40 weight parts |
| compound (N-octylpyrrole) | |
| Radically polymerizable compound | 35 weight parts |
| (phenoxyethyl acrylate) | |
| Photolytically acid generating agent | 5 weight parts |
| (Irgacure 369, manufactured | |
| by Ciba Specialty Chemicals | |
| Co.) | |
| Ink Composition 5 | |
| | |
| White Pigment Dispersion 1 | 20 weight parts |
| Oxidatively polymerizable compound | 40 weight parts |
| (N-octylpyrrole) | |
| Vinyl ether compound (triethylene | 35 weight parts |
| glycol vinyl ether) | |
| Photolytically acid generating agent | 5 weight parts |
| (Uvacure 1591, manufactured | |
| by Dicel UCB Co.) | |
| Ink Composition 6 | |
| | |
| White Pigment Dispersion 1 | 20 weight parts |
| Oxidatively polymerizable compound | 40 weight parts |
| (N-octylpyrrole) | |
| Maleimide derivative described | 35 weight parts |
| below | |
| Photolytically acid generating agent | 5 weight parts |
| (2-benzyl-dimethylamino-4'- | |
| morpholinobutyrophenone, | |
| Irgacure 369, manufactured | |
| by Ciba Specialty Chemicals | |
| Co.) | |
| Maleimide derivative | |

-continued

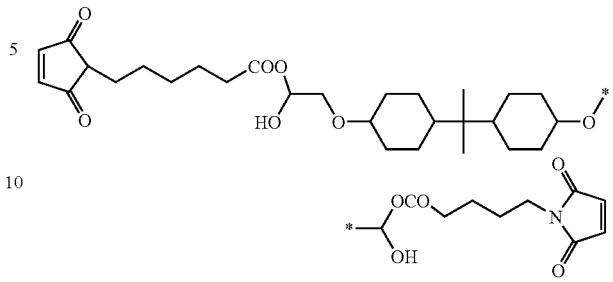

Ink Composition 7

| | |
|---|---|
| White pigment dispersion 2 | 20 weight parts |
| Oxidatively polymerizable compound | 40 weight parts |
| (N-diethylaniline) | |
| Epoxy compound (Celoxide 2021P, | 35 weight parts |
| manufactured by Daicel Kagaku | |
| Kogyo Co.) | |
| Photolytically acid generating agent | 5 weight parts |
| (Uvacure 1591, manufactured by | |
| Dicel UCB Co.) | |

Ink Composition 8

| | |
|---|---|
| White pigment dispersion 1 | 20 weight parts |
| Oxidatively polymerizable compound | 40 weight parts |
| (3,4-dimethylthiophene) | |
| Oxetane compound (Aron Oxetane | 35 weight parts |
| OXT-221, manufactured by | |
| Toagosei Kagaku Co.) | |
| Photolytically acid generating agent | 5 weight parts |
| (Uvacure 1591, manufactured by | |
| Dicel UCB Co.) | |

(White Curable Ink)

Each of the aforesaid ink compositions was filtered employing a filter having an absolute filtration accuracy of 2 μm. The resulting filtrates were designated as White Curable Inks 1–8.

(Ink-Jet Recording Apparatus)

Each of aforesaid White Curable Inks 1–8 was loaded into an ink-jet recording apparatus employing piezoelectric type ink-jet nozzles, and recording was carried out onto recording media.

The ink supply system comprised of an ink tank, a supply pipe, a pre-chamber ink tank just prior to the head, piping fitted with a filter, and a piezoelectric head. The portion from the pre-chamber tank to the head was allowed to be heated or not heated. A temperature sensor was arranged in the pre-chamber tank and in the portion near nozzles of the piezoelectric head, and the temperature of the nozzle portion was continuously controlled to be at 70±2° C.

The piezoelectric head was operated to enable ejection of 8–30 μl multi-size dots of 720×720 dpi (dpi refers to the number of dots per inch or 2.54 cm) dots.

(Evaluation of Characteristics Based on Imaging)

Employed as recording media were 50 μm thick transparent shrink PET (polyethylene terephthalate) substrates. After ejection, UV irradiation was carried out at an amount of the total exposure energy of 160 mJ/cm². As a result, when White Curable Ink 1–8, except for 3, were employed, it was possible to form white images and white text which resulted in excellent adhesion to the substrate and durability. Further, when color images were provided on the resulting image, even on the transparent substrate, it was possible to form images resulting in excellent color formation and visibility.

Further, by employing the ink compositions according to the present invention, printing was carried out in the same manner as above onto OPS (oriented polystyrene) substrates, printed circuit boards, and black plastic substrates, whereby it was possible to result in excellent printing properties with desired visibility in the same manner as above.

When White Ink 3 was employed, after irradiation of UV radiation, recording media resulted in wrinkling as well as curling and the text suffered from bleeding, making difficult to produce excellent images.

According to the present invention, it is possible to provide a cation based curable white ink composition for inkjet printing, which results in excellent visibility for non-ink absorptive transparent recording media, low lightness recording media and metal surfaces, as well as excellent image quality, drying properties, substrate adhesion, and durability, and specifically results in excellent curing properties, minimal shrinkage, and safety.

What is claimed is:

1. A curable ink for ink-jet recording comprising a white pigment, having an average particle size of 0.1 to 1.0 µm, and a polymerizable compound selected from the group consisting of oxetane compounds,
wherein the curable ink further comprises an epoxy compound or a vinyl ether compound; the curable ink has a viscosity of 10 to 500 mPa·s at 30° C. and a viscosity of 7 to 30 mPa·s when heated to at lease 40° C.; and a ratio of the oxetane compound in the ink is 65 to 95 weight% based on the total weight of the ink.

2. The curable ink of claim 1, wherein the ink further comprises a compound selected from the group consisting of:
   ethylenically unsaturated monomers capable of radical polymerizing; and
   maleimide compounds.

3. The curable ink of claim 1, further comprising an acid generating agent by irradiation with an actinic ray.

4. The curable ink of claim 1, wherein a ratio of the white pigment is 1 to 50 weight % based on the total weight of the ink.

5. The curable ink of claim 1, wherein the white pigment is an inorganic white pigment.

6. The curable ink of claim 5, wherein the white pigment is titanium oxide.

7. The curable ink of claim 1, wherein the white pigment is an organic white pigment.

8. The curable ink of claim 1, wherein the ink contains substantially no solvent.

* * * * *